United States Patent
Sagar et al.

(10) Patent No.: US 12,315,054 B2
(45) Date of Patent: May 27, 2025

(54) REAL-TIME GENERATION OF SPEECH ANIMATION

(71) Applicant: Soul Machines Limited, Auckland (NZ)

(72) Inventors: Mark Sagar, Auckland (NZ); Tim Szu-Hsien Wu, Auckland Central (NZ); Xiani Tan, Auckland (NZ); Xueyuan Zhang, Auckland (NZ)

(73) Assignee: SOUL MACHINES LIMITED, Auckland (NZ)

( * ) Notice: Subject to any disclaimer, the term of this patent is extended or adjusted under 35 U.S.C. 154(b) by 203 days.

(21) Appl. No.: 17/422,167

(22) PCT Filed: Jan. 27, 2020

(86) PCT No.: PCT/IB2020/050620
§ 371 (c)(1),
(2) Date: Jul. 9, 2021

(87) PCT Pub. No.: WO2020/152657
PCT Pub. Date: Jul. 30, 2020

(65) Prior Publication Data
US 2022/0108510 A1   Apr. 7, 2022

(30) Foreign Application Priority Data

Jan. 25, 2019   (NZ) ........................ 750233

(51) Int. Cl.
*G06T 13/20* (2011.01)
*G06T 13/80* (2011.01)
(Continued)

(52) U.S. Cl.
CPC ............ *G06T 13/205* (2013.01); *G06T 13/80* (2013.01); *G10L 15/02* (2013.01); *G10L 21/12* (2013.01);
(Continued)

(58) Field of Classification Search
CPC ....... G06T 13/205; G06T 13/80; G10L 15/02; G10L 21/12; G10L 2015/025; G10L 2021/105
See application file for complete search history.

(56) References Cited

U.S. PATENT DOCUMENTS 4,884,972 A * 12/1989 Gasper .................. G09B 5/065
434/167
5,111,409 A * 5/1992 Gasper .................. G06T 13/205
434/167
(Continued)

FOREIGN PATENT DOCUMENTS

EP     2849087 A1   3/2015
JP   2009087328 A   4/2009
(Continued)

OTHER PUBLICATIONS

S. Okita, Y. Mitsukura and N. Hamada, "Augmented classification of Japanese visemes and hierarchical weighted discrimination for visual speech recognition," 2013 IEEE Conference on Systems, Process & Control (ICSPC), Kuala Lumpur, Malaysia, 2013, pp. 62-67, doi: 10.1109/SPC.2013.6735104. (Year: 2013).*

(Continued)

*Primary Examiner* — Charles L Beard
(74) *Attorney, Agent, or Firm* — MARSHALL, GERSTEIN & BORUN LLP

(57) ABSTRACT

To realistically animate a String (such as a sentence) a hierarchical search algorithm is provided to search for stored examples (Animation Snippets) of sub-strings of the String, in decreasing order of sub-string length, and concatenate retrieved sub-strings to complete the String of speech animation. In one embodiment, real-time generation of speech animation uses model visemes to predict the animation sequences at onsets of visemes and a look-up table based (data-driven) algorithm to predict the dynamics at transitions
(Continued)

| | | Priority on Expression Animation | | | Priority on Speech Animation | | |
|---|---|---|---|---|---|---|---|
| | | AU12 | AU22 | AU26 | AU12 | AU22 | AU26 |
| class weighting | Expression | 1 | 0 | 0.5 | 1 | 0 | 0.5 |
| | Speech | 0 | 1 | 0.5 | 0 | 1 | 0.5 |
| Priority weighting | Expression | 1 | 1 | 1 | 0 | 0 | 0 |
| | Speech | 0 | 0 | 0 | 1 | 1 | 1 |
| Composer Multiplier | Expression | 1 | 1 | 1 | 1 | 0 | 0 |
| | Speech | 0 | 1 | 0 | 1 | 1 | 1 | of visemes. Specifically posed Model Visemes may be blended with speech animation generated using another method at corresponding time points in the animation when the visemes are to be expressed. An Output Weighting Function is used to map Speech input and Expression input into Muscle-Based Descriptor weightings.

14 Claims, 8 Drawing Sheets

(51) Int. Cl.
    *G10L 15/02*      (2006.01)
    *G10L 21/12*      (2013.01)
    *G10L 21/10*      (2013.01)

(52) U.S. Cl.
    CPC .. *G10L 2015/025* (2013.01); *G10L 2021/105* (2013.01)

(56) References Cited

U.S. PATENT DOCUMENTS

| | | | | |
|---|---|---|---|---|
| 5,390,278 | A * | 2/1995 | Gupta | G10L 15/142 704/E15.032 |
| 5,613,056 | A * | 3/1997 | Gasper | G11B 27/10 704/E21.02 |
| 5,636,325 | A * | 6/1997 | Farrett | G10L 13/10 704/260 |
| 5,657,426 | A * | 8/1997 | Waters | G10L 15/24 704/E15.041 |
| 5,687,287 | A * | 11/1997 | Gandhi | G10L 17/14 704/256.4 |
| 5,857,173 | A * | 1/1999 | Beard | G10L 15/18 704/254 |
| 5,860,064 | A * | 1/1999 | Henton | G10L 13/033 204/266 |
| 5,880,788 | A * | 3/1999 | Bregler | H04N 5/14 348/576 |
| 5,995,119 | A * | 11/1999 | Cosatto | G06T 13/40 345/473 |
| 6,147,692 | A * | 11/2000 | Shaw | G06T 13/80 345/643 |
| 6,208,356 | B1 * | 3/2001 | Breen | G10L 15/25 345/473 |
| 6,249,292 | B1 * | 6/2001 | Christian | G11B 27/10 345/473 |
| 6,250,928 | B1 * | 6/2001 | Poggio | G09B 19/04 434/167 |
| 6,292,778 | B1 * | 9/2001 | Sukkar | G10L 15/08 704/256.4 |
| 6,307,576 | B1 * | 10/2001 | Rosenfeld | G06T 13/40 704/E21.02 |
| 6,504,546 | B1 * | 1/2003 | Cosatto | G06T 13/40 345/473 |
| 6,539,354 | B1 * | 3/2003 | Sutton | G10L 13/00 704/E21.02 |
| 6,556,196 | B1 * | 4/2003 | Blanz | G06V 40/175 345/646 |
| 6,633,846 | B1 * | 10/2003 | Bennett | G10L 15/30 704/E15.047 |
| 6,654,018 | B1 * | 11/2003 | Cosatto | G10L 13/08 704/E21.02 |
| 6,661,418 | B1 * | 12/2003 | McMillan | G06T 13/205 704/E21.02 |
| 6,919,892 | B1 * | 7/2005 | Cheiky | G06T 13/40 348/E5.022 |
| 7,027,054 | B1 * | 4/2006 | Cheiky | H04N 5/262 345/473 |
| 7,168,953 | B1 * | 1/2007 | Poggio | G06T 13/205 704/E21.02 |
| 7,209,882 | B1 * | 4/2007 | Cosatto | G10L 15/26 704/E21.02 |
| 7,216,079 | B1 * | 5/2007 | Barnard | G10L 15/063 704/244 |
| 7,752,044 | B2 * | 7/2010 | Lam | G10L 15/08 704/254 |
| 8,581,911 | B2 * | 11/2013 | Becker | G06T 13/40 345/581 |
| 8,744,856 | B1 * | 6/2014 | Ravishankar | G09B 19/04 704/254 |
| 9,094,576 | B1 * | 7/2015 | Karakotsios | G10L 15/02 |
| 9,812,151 | B1 * | 11/2017 | Amini | G06T 13/40 |
| 9,911,218 | B2 * | 3/2018 | Theobald | G06T 13/80 |
| 10,360,716 | B1 * | 7/2019 | van der Meulen | G10L 25/57 |
| 10,521,946 | B1 * | 12/2019 | Roche | G10L 13/00 |
| 10,530,928 | B1 * | 1/2020 | Ouimette | H04M 3/5158 |
| 10,586,369 | B1 * | 3/2020 | Roche | G10L 13/00 |
| 10,629,192 | B1 * | 4/2020 | Streat | G10L 15/063 |
| 10,732,708 | B1 * | 8/2020 | Roche | G10L 15/22 |
| 10,770,092 | B1 * | 9/2020 | Adams | G10L 21/18 |
| 11,113,859 | B1 * | 9/2021 | Xiao | G06T 15/005 |
| 11,232,645 | B1 * | 1/2022 | Roche | G06V 20/20 |
| 11,270,487 | B1 * | 3/2022 | Steptoe | G06V 40/171 |
| 11,386,900 | B2 * | 7/2022 | Shillingford | G06N 3/044 |
| 11,468,616 | B1 * | 10/2022 | Steptoe | G06V 40/16 |
| 11,551,393 | B2 * | 1/2023 | Shang | G10L 21/10 |
| 2002/0013707 | A1 * | 1/2002 | Shaw | G10L 15/063 704/257 |
| 2002/0087329 | A1 * | 7/2002 | Massaro | G06T 13/205 704/275 |
| 2003/0137515 | A1 * | 7/2003 | Cederwall | G06T 13/40 345/473 |
| 2003/0184547 | A1 * | 10/2003 | Haratsch | G06T 9/001 345/473 |
| 2004/0068408 | A1 * | 4/2004 | Qian | G10L 15/25 704/E21.02 |
| 2004/0098264 | A1 * | 5/2004 | Bowater | G10L 19/167 704/E19.048 |
| 2004/0107106 | A1 * | 6/2004 | Margaliot | G10L 21/10 704/E21.02 |
| 2004/0111266 | A1 * | 6/2004 | Coorman | G10L 13/07 704/260 |
| 2005/0057570 | A1 * | 3/2005 | Cosatto | G06T 13/40 704/E21.02 |
| 2005/0080625 | A1 * | 4/2005 | Bennett | G10L 15/183 704/E15.047 |
| 2006/0009978 | A1 * | 1/2006 | Ma | G06T 13/40 704/E21.02 |
| 2006/0136214 | A1 * | 6/2006 | Sato | G10L 13/027 704/265 |
| 2006/0149558 | A1 * | 7/2006 | Kahn | G10L 15/063 704/278 |
| 2006/0221084 | A1 * | 10/2006 | Yeung | G06T 13/205 382/218 |
| 2006/0290699 | A1 | 12/2006 | Dimtrva et al. | |
| 2007/0033042 | A1 * | 2/2007 | Marcheret | G10L 25/78 704/215 |
| 2007/0038450 | A1 * | 2/2007 | Josifovski | G06F 16/3343 707/E17.026 |
| 2007/0233492 | A1 * | 10/2007 | Matsumoto | G10L 13/10 704/260 |
| 2008/0163074 | A1 * | 7/2008 | Tu | G10L 13/08 704/E21.02 |
| 2008/0259085 | A1 * | 10/2008 | Chen | G06T 13/40 345/473 |
| 2008/0270129 | A1 * | 10/2008 | Colibro | G10L 15/19 704/E15.005 |
| 2008/0294433 | A1 * | 11/2008 | Yeung | G10L 15/05 704/235 |
| 2008/0305454 | A1 * | 12/2008 | Kitching | A61C 7/00 433/24 |
| 2009/0044112 | A1 | 2/2009 | Basso et al. | |
| 2009/0112905 | A1 * | 4/2009 | Mukerjee | G06F 16/322 707/999.102 |
| 2009/0313016 | A1 * | 12/2009 | Cevik | G10L 15/22 704/E15.001 |
| 2009/0319270 | A1 * | 12/2009 | Gross | G10L 13/08 704/E15.001 |

(56) References Cited

U.S. PATENT DOCUMENTS

| | | | | |
|---|---|---|---|---|
| 2010/0007665 | A1* | 1/2010 | Smith | G06T 13/40 345/473 |
| 2010/0085363 | A1* | 4/2010 | Smith | H04N 5/262 345/473 |
| 2010/0145698 | A1* | 6/2010 | Chen | G09B 19/06 704/256.1 |
| 2010/0332229 | A1* | 12/2010 | Aoyama | G09B 19/04 704/251 |
| 2011/0106792 | A1* | 5/2011 | Robertson | G10L 15/26 707/723 |
| 2011/0131041 | A1* | 6/2011 | Cortez | G10L 15/25 704/235 |
| 2011/0175921 | A1* | 7/2011 | Havaldar | G06T 13/40 345/473 |
| 2012/0130717 | A1* | 5/2012 | Xu | G06F 3/167 345/473 |
| 2013/0006629 | A1* | 1/2013 | Honda | G10L 15/187 704/E15.001 |
| 2013/0065205 | A1 | 3/2013 | Park | |
| 2013/0191129 | A1* | 7/2013 | Kurata | G10L 15/10 704/254 |
| 2013/0218568 | A1* | 8/2013 | Tamura | G10L 13/06 704/260 |
| 2013/0304587 | A1* | 11/2013 | Ralston | G06Q 30/0275 705/14.67 |
| 2014/0035929 | A1* | 2/2014 | Matthews | G06T 17/20 345/473 |
| 2014/0141392 | A1* | 5/2014 | Yoon | G09B 5/04 434/156 |
| 2014/0372100 | A1* | 12/2014 | Jeong | G06T 13/40 704/2 |
| 2015/0052084 | A1* | 2/2015 | Kolluru | G06T 13/40 706/11 |
| 2015/0287403 | A1* | 10/2015 | Holzer Zaslansky | G06T 13/205 704/231 |
| 2016/0030744 | A1* | 2/2016 | Hubert-Brierre | G10L 21/10 607/57 |
| 2016/0180568 | A1* | 6/2016 | Bullivant | G06N 3/004 345/473 |
| 2016/0203827 | A1* | 7/2016 | Leff | G10L 19/125 704/207 |
| 2016/0328875 | A1* | 11/2016 | Fang | G06V 40/176 |
| 2017/0154457 | A1* | 6/2017 | Theobald | G10L 15/187 |
| 2017/0178623 | A1* | 6/2017 | Shamir | G10L 15/1822 |
| 2017/0243387 | A1* | 8/2017 | Li | G06V 20/46 |
| 2017/0294188 | A1* | 10/2017 | Hayakawa | G10L 15/02 |
| 2018/0027123 | A1* | 1/2018 | Cartwright | H04M 3/42221 379/202.01 |
| 2018/0027351 | A1* | 1/2018 | Cartwright | H04M 3/56 381/303 |
| 2018/0047385 | A1* | 2/2018 | Jiang | G10L 15/063 |
| 2018/0068661 | A1* | 3/2018 | Printz | G10L 15/1815 |
| 2018/0075843 | A1* | 3/2018 | Hayakawa | G10L 15/08 |
| 2018/0095636 | A1* | 4/2018 | Valdivia | G06F 3/011 |
| 2018/0096507 | A1* | 4/2018 | Valdivia | G06F 3/04842 |
| 2018/0098059 | A1* | 4/2018 | Valdivia | G06F 3/011 |
| 2018/0157901 | A1* | 6/2018 | Arbatman | H04L 51/10 |
| 2018/0182396 | A1* | 6/2018 | An | G10L 15/26 |
| 2018/0197322 | A1* | 7/2018 | Sagar | G06T 7/75 |
| 2018/0253881 | A1* | 9/2018 | Edwards | G10L 21/10 |
| 2018/0277145 | A1* | 9/2018 | Yamaya | G10L 25/63 |
| 2018/0279063 | A1* | 9/2018 | Sun | H04M 3/565 |
| 2018/0295240 | A1* | 10/2018 | Dickins | H04M 3/568 |
| 2018/0336902 | A1* | 11/2018 | Cartwright | G06F 16/61 |
| 2018/0350388 | A1* | 12/2018 | Jain | G11B 27/005 |
| 2019/0013008 | A1* | 1/2019 | Kunitake | G10L 15/08 |
| 2019/0057533 | A1* | 2/2019 | Habra | G06T 13/205 |
| 2019/0147838 | A1* | 5/2019 | Serletic, II | G10L 13/027 704/260 |
| 2019/0287515 | A1* | 9/2019 | Li | G06N 3/084 |
| 2019/0392823 | A1* | 12/2019 | Li | G06N 3/044 |
| 2020/0106708 | A1* | 4/2020 | Sleevi | H04L 65/80 |
| 2020/0126283 | A1* | 4/2020 | Van Vuuren | G06T 17/20 |
| 2020/0135226 | A1* | 4/2020 | Mittal | G06T 7/11 |
| 2020/0160581 | A1* | 5/2020 | Heller | G10L 25/57 |
| 2020/0211248 | A1* | 7/2020 | Baker | G06T 13/40 |
| 2020/0279553 | A1* | 9/2020 | McDuff | G10L 25/78 |
| 2020/0302667 | A1* | 9/2020 | del val Santos | G06N 3/044 |
| 2021/0050031 | A1* | 2/2021 | Hancock | G10L 15/187 |
| 2021/0110831 | A1* | 4/2021 | Shillingford | G06V 20/40 |
| 2021/0158812 | A1* | 5/2021 | Wooters | G10L 15/197 |
| 2021/0248801 | A1* | 8/2021 | Li | G06T 13/205 |
| 2021/0248804 | A1* | 8/2021 | Hussen Abdelaziz | G06T 13/80 |
| 2021/0327431 | A1* | 10/2021 | Stewart | G06V 40/45 |
| 2021/0375260 | A1* | 12/2021 | Yu | G10L 15/142 |
| 2021/0390949 | A1* | 12/2021 | Wang | G10L 15/04 |
| 2022/0075820 | A1* | 3/2022 | Walker | G06F 16/75 |
| 2022/0076025 | A1* | 3/2022 | Shin | G06V 20/49 |
| 2022/0076026 | A1* | 3/2022 | Walker | G06V 40/161 |
| 2022/0076424 | A1* | 3/2022 | Shin | G06V 40/161 |
| 2022/0076705 | A1* | 3/2022 | Walker | G06F 16/75 |
| 2022/0076707 | A1* | 3/2022 | Walker | G06V 20/41 |
| 2022/0084273 | A1* | 3/2022 | Pan | G06N 3/049 |
| 2022/0108510 | A1* | 4/2022 | Sagar | G10L 21/12 |
| 2022/0191429 | A1* | 6/2022 | Astarabadi | H04N 7/15 |
| 2022/0215830 | A1* | 7/2022 | Jawahar | G10L 21/10 |
| 2022/0247973 | A1* | 8/2022 | Astarabadi | G06V 10/82 |
| 2022/0392430 | A1* | 12/2022 | Kilgore | G06F 3/017 |
| 2023/0111633 | A1* | 4/2023 | Paruchuri | G06T 13/40 705/26.7 |
| 2023/0117787 | A1* | 4/2023 | Wu | G06T 13/40 345/419 |
| 2023/0130287 | A1* | 4/2023 | Zhao | G06T 13/40 345/474 |
| 2023/0237987 | A1* | 7/2023 | Fukuda | G10L 15/02 704/200 |
| 2023/0306959 | A1* | 9/2023 | Lin | G06N 3/08 |
| 2023/0353707 | A1* | 11/2023 | Astarabadi | G06T 11/20 |
| 2023/0377238 | A1* | 11/2023 | Hutton | G06F 40/284 |
| 2024/0013802 | A1* | 1/2024 | Federov | G10L 25/30 |
| 2024/0087557 | A1* | 3/2024 | Levine | G10L 13/086 |
| 2024/0135973 | A1* | 4/2024 | Bai | G11B 27/031 |
| 2024/0177391 | A1* | 5/2024 | Pan | G10L 21/10 |

FOREIGN PATENT DOCUMENTS

| | | |
|---|---|---|
| KR | 2006-0031449 A | 4/2006 |
| KR | 10-2006-0090687 A | 8/2006 |
| KR | 100813034 B1 | 3/2008 |
| KR | 20120130627 A | 12/2012 |
| WO | WO-2004/100128 A1 | 11/2004 |
| WO | WO-2012/154618 A2 | 11/2012 |
| WO | 2015/016723 A1 | 2/2015 |
| WO | 2017/044499 A1 | 3/2017 |
| WO | WO-2017/075452 A1 | 5/2017 |

OTHER PUBLICATIONS

R. Amini, C. Lisetti and G. Ruiz, "HapFACS 3.0: FACS-Based Facial Expression Generator for 3D Speaking Virtual Characters," in IEEE Transactions on Affective Computing, vol. 6, No. 4, pp. 348-360, Oct.-Dec. 1, 2015, doi: 10.1109/TAFFC.2015.2432794. (Year: 2015).*

Zhilin Wu and P. S. Aleksic, "Inner lip feature extraction for MPEG-4 facial animation," 2004 IEEE International Conference on Acoustics, Speech, and Signal Processing, Montreal, QC, Canada, 2004, pp. iii-633, doi: 10.1109/ICASSP.2004.1326624. (Year: 2004).*

Zhigang Deng, U. Neumann, J. P. Lewis, Tae-Yong Kim, M. Bulut and S. Narayanan, "Expressive Facial Animation Synthesis by Learning Speech Coarticulation and Expression Spaces," in IEEE Transactions on Visualization and Computer Graphics, vol. 12, No. 6, pp. 1523-1534, Nov.-Dec. 2006. (Year: 2006).*

E. Bozkurt, C. E. Erdem, E. Erzin, T. Erdem and M. Ozkan, "Comparison of Phoneme and Viseme Based Acoustic Units for Speech Driven Realistic lip Animation," 2007 3DTV Conference, Kos, Greece, 2007, pp. 1-4, doi: 10.1109/3DTV.2007.4379417. (Year: 2007).*

(56) References Cited

OTHER PUBLICATIONS

L. Dong, Y. Wang, K. Ni and K. Lu, "Facial animation system based on image warping algorithm," 2011 International Conference on Electronics, Communications and Control (ICECC), Ningbo, China, 2011, pp. 2648-2653, doi: 10.1109/ICECC.2011.6066515. (Year : 2011).*

S. A. King and R. E. Parent, "Creating speech-synchronized animation," in IEEE Transactions on Visualization and Computer Graphics, vol. 11, No. 3, pp. 341-352, May-Jun. 2005, doi: 10.1109/TVCG.2005.43. (Year: 2005).*

A. Verma, L. V. Subramaniam, N. Rajput, C. Neti and T. A. Faruquie, "Animating expressive faces across languages, " in IEEE Transactions on Multimedia, vol. 6, No. 6, pp. 791-800, Dec. 2004, doi: 10.1109/TMM.2004.837256. (Year: 2004).*

PCT Application No. PCT/IB2020/050620 International Search Report dated Jun. 25, 2020.

Office Action issued in Korean Patent Application No. 10-2021-7026491 dated Mar. 22, 2024.

Office Action, Australian Patent Application No. 2020211809, mailing date Jan. 5, 2024.

European Search Report and Opinion, European Application No. 20744394.6, mailing date Aug. 1, 2022.

Written Opinion, Signapore Patent Application No. 11202107022Y, mailing date May 11, 2023.

* cited by examiner

Author of the danger trail Philip Steels et cetera.

| | | | | | | | | | | |
|---|---|---|---|---|---|---|---|---|---|---|
| Word | /O T @/ | | | /d EI n dZ @/ | | | /f I l p/ | | /s E t r @/ | |
| Syllable | /O/ /T @/ | /O v/ | /D @/ | /d EI n/ /dZ @/ | /t r EI l/ | | /f I/ /l p/ | /s d i i z/ | /E t/ | /s E t/ /r @/ |
| Vowel-centred tripho | /T @ O/ | /@ O v/ | /O @ d/ | /d EI n/ /dZ @ t/ | /r EI l/ | | /f I l/ /l p/ | /d i l/ | /z E t/ | /s E t/ |
| Consonent-centred tripho | /O T @/ /O v D/ /v D @/ /@ d EI/ /EI n dZ/ /n dZ @/ /@ t r/ /t r EI/ /EI l/ /l f I/ /f I l/ /l p s/ /p s d/ /s d i/ /l z/ /l z E/ /E t s/ /t s E/ /E t r/ /r @/ | | | | | | | | | | |
| Sentence-boundary tripho | /O T/ | | | | | | | | | /r @/ |
| Dipho | /O T/ /T @/ /@ O/ /O v/ /v D/ /D @/ /@ d/ /d EI/ /EI n/ /n dZ/ /dZ @/ /@ t/ /t r/ /r EI/ /EI l/ /l f/ /f I/ /I l/ /l p/ /p s/ /s d/ /d i/ /i l/ /l z/ /z E/ /E t/ /t s/ /s E/ /E t/ /t r/ /r @/ | | | | | | | | | | |
| Sentence-boundary left halfpho | /O/ | | | | | | | | | /@/ |
| Left halfpho | /O/ /T/ /@/ | /O/ /v/ | /D/ /@/ | /d/ /EI/ /n/ /dZ/ /@/ | /t/ /r/ /EI/ /l/ | | /f/ /I/ /l/ /l/ /p/ | /s/ /d/ /i/ /i/ /z/ | /E/ /t/ | /s/ /E/ /t/ /r/ /@/ |
| Right halfpho | /O/ /T/ /@/ | /O/ /v/ | /D/ /@/ | /d/ /EI/ /n/ /dZ/ /@/ | /t/ /r/ /EI/ /l/ | | /f/ /I/ /l/ /l/ /p/ | /s/ /d/ /i/ /i/ /z/ | /E/ /t/ | /s/ /E/ /t/ /r/ /@/ |

FIGURE 4

Ask her to bring these things with her from the store.

| | | | | | | | | | | |
|---|---|---|---|---|---|---|---|---|---|---|
| Word | | | | | | | | | | |
| Word and Syllable | /A s k/ | /h r=/ | /t u/ | /b r I N/ | /D i z/ | /T I N z/ | /w I D/ | /h r=/ | /f r O m/ | /D @/ |
| Vowel-centred tripho | | | | | | | | | /d O r/ | |
| Consonent-centred tripho | | | | | | | | | /@ s d/ | |
| Sentence-boundary tripho | | | | | | | | | | |
| Dipho | /k h/ | /r= t/ | /u b/ | /N D/ | /z T/ | /z w/ | /D h/ | /r= f/ | /m D/ | |
| Sentence-boundary left halfpho | /A/ | | | | | | | | | /r/ |
| Left halfpho | | | | | | | | | | |
| Right halfpho | | | | | | | | | | |

FIGURE 5

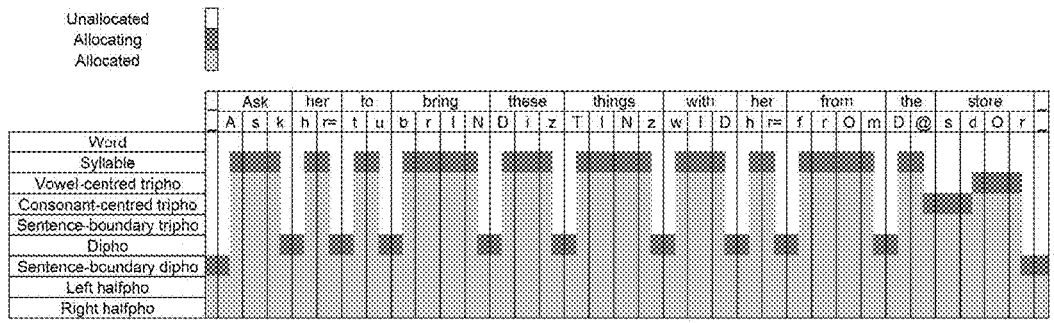
FIGURE 6
And we will go meet her Wednesday at the train station
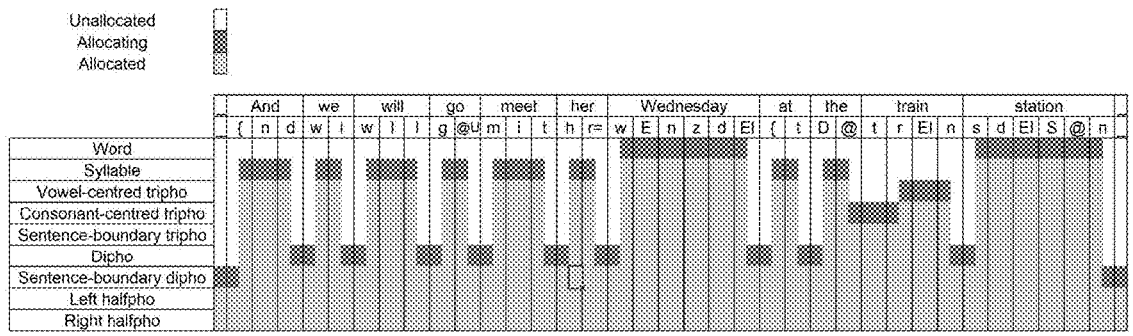
FIGURE 7
FIGURE 8

| | | Priority on Expression Animation | | | Priority on Speech Animation | | |
|---|---|---|---|---|---|---|---|
| | | AU12 | AU22 | AU26 | AU12 | AU22 | AU26 |
| class weighting | Expression | 1 | 0 | 0.5 | 1 | 0 | 0.5 |
| | Speech | 0 | 1 | 0.5 | 0 | 1 | 0.5 |
| Priority weighting | Expression | 1 | 1 | 1 | 0 | 0 | 0 |
| | Speech | 0 | 0 | 0 | 1 | 1 | 1 |
| Composer Multiplier | Expression | 1 | 1 | 1 | 1 | 0 | 0 |
| | Speech | 0 | 1 | 0 | 1 | 1 | 1 |

|  |  | Priority on Expression Animation | Prioritize Speech Animation | No Priority |
|---|---|---|---|---|
|  |  | AU24 | AU24 | AU24 |
| class weighting | Expression | 0.2 | 0.2 | 0.2 |
|  | Speech | 0.8 | 0.8 | 0.8 |
| Priority weighting | Expression | 1 | 0 | 0.5 |
|  | Speech | 0 | 1 | 0.5 |
| Composer Multiplier | Expression | 1 | 0 | 0.2 |
|  | Speech | 0.6 | 1 | 0.8 |

FIGURE 14

REAL-TIME GENERATION OF SPEECH ANIMATION

CROSS-REFERENCE TO RELATED APPLICATIONS

This application is a 371 U.S. National Stage application of International Application No. PCT/IB2020/050620, filed on Jan. 27, 2020, which claims the benefit of priority to New Zealand Application No. 750233 filed on Jan. 25, 2019, the contents of which are incorporated herein by reference in their entirety.

TECHNICAL FIELD

Embodiments of the invention relate to real-time generation of speech animation.

BACKGROUND ART

Computer facial animation techniques for animating speech include procedural, data-driven, or performance-capture based techniques.

Each sentence in a corpus (collection of text) may be represented as a sequence of phonemes (units of distinct speech/sound) and as a sequence of visemes (the visual equivalent of phonemes showing the phonemes being pronounced). Procedural speech animation includes rules or look-up tables which convert phonemes to visemes. Online real-time generation of 3D animation curves for speech may be performed by looking up animation sequences of visemes using phonemes. Such approaches are limited by the small set of animation sequences, as robotic, unrealistic, and repetitive animations are frequently observed especially at the transitions of the visemes.

Data-driven (statistical) methods stitch snippets of facial animation data from a large corpus, to match an input speech track. Facial dynamics are captured by multi-dimensional morphable models, hidden Markov models, and active appearance models (AAM). The quality of data-driven approaches is often limited by the data available. Statistical models drive the face directly, taking control away from an animator.

Performance-capture based speech animation transfers acquired motion data from a human performer onto a digital face model. One approach uses a pre-captured database to correct performance capture with a deep neural network trained to extract phoneme probabilities from audio input in real time. Training such models requires large datasets of hand-crafted animation sequences or performances. The resulting models are often complex, making the playback and inference difficult to achieve in real time. Animation quality is limited by the captured actor's abilities as it is difficult for an animator to refine.

Prior speech animation techniques also fail to adequately accommodate the combination of speech animation with emotional expression animation.

OBJECTS OF THE INVENTION

It is an object of the present invention to improve real-time generation of speech animation or to at least provide the public or industry with a useful choice.

SUMMARY OF THE INVENTION

A method for animating speech comprising: receiving: a String to be animated, the String comprising a plurality of communicative utterance (e.g. speech) atoms; a plurality of Collections, each Collection including a plurality of Items comprising unique atom strings, each Collection storing Items of different lengths; and each Item including at least one Animation Snippet of the Item; hierarchically searching the Collections for Items matching substrings of the String; retrieving Animation Snippets for matched Items to cover speech atoms; and combining the retrieved Animation Snippets to animate the String.

A method for animating speech comprising: receiving: a String of phonemes to be animated; and a plurality of Animation Snippets comprising strings of polyphones and part-phonemes configured to be concatenated at or about the most stable part of a phoneme; searching for and retrieving Animation Snippets matching substrings of the String of phonemes to cover the String of phonemes; and combining the retrieved Animation Snippets to animate the String.

A method for animating a phoneme in context comprising: receiving: a Model Viseme; and an Animation Snippet corresponding to a time series of animation weights of the phoneme being pronounced in context; blending between the animation weights of the Model Viseme and the animation weights of the Animation Snippet to animate the phoneme in context.

A method for expressive speech animation including: receiving: a first animation input associated with muscle-based descriptor information; and a second animation input associated with muscle-based descriptor information; using the first animation input and the second animation input as arguments in a Output Weighting Function configured to map the animation inputs to muscle-based descriptor weightings for animating the expressive speech animation wherein the Output Weighting Function is configured to reconcile muscle-based descriptor information from the first and second animation inputs and; animating using the mapped muscle-based descriptor weightings.

BRIEF DESCRIPTION OF DRAWINGS

FIG. 4 shows text processing for construction of the lookup table;

FIG. 5 shows an example of matching substrings from different Collections to a sentence;

FIG. 6 shows a combination of retrieved Animation Snippets to animate the String of FIG. 5;

FIG. 7 shows an example of matching substrings from different Collections to a sentence;

FIG. 8 shows a combination of retrieved Animation Snippets to animate the String of FIG. 7;

FIG. 14 shows a table of multiplier values used in the animation composer;

DETAILED DESCRIPTION

Figure 1:
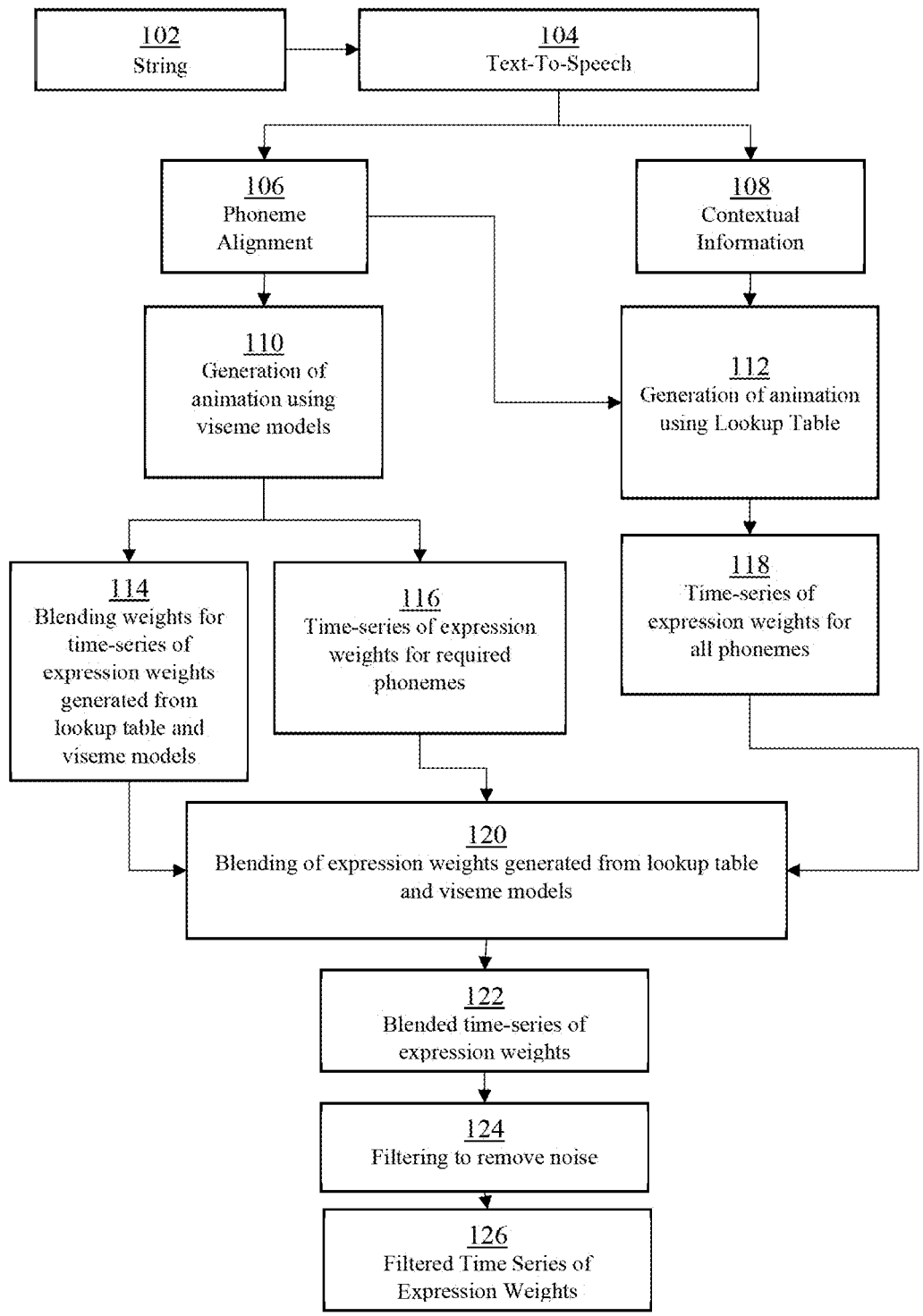
FIG. 1 shows a flow diagram of a process for generating speech animation.

As described under Part 1 "Hierarchical Look-Up & Polyphone Concatenation", animation sequences are played back from recorded performances to develop viseme sequences and populate a Lookup Table. This introduces variation in the dynamics of the viseme transitions and incorporates personal styles. The selection of recorded animation sequences is based on a computationally efficient concatenative unit-selection model (using a hierarchical search algorithm).

Manually created or specifically selected (model) animation sequences of visemes may be introduced at the onsets of phonemes (blended with the animation sequences obtained from the methods described under part 1) to ensure the full development of visual cues for the purpose of lip-reading. This is described in detail under Part 2, "Blending with Model Visemes". The generated speech animation sequences may be smoothed and blended to reduce visual artifacts. Part 0 explains how the methods disclosed under Part 1 and Part 2 can be applied beyond animation of speech, to animation of gestures.

Part 4 describes techniques for allowing facial expressions to be superimposed onto a speech animation to introduce emotional variations to speech. An Output Weighting Function ensures that Speech and Expression muscles are not expressed in a manner that conflicts.

The techniques described herein may be used to animate speech of a virtual character or digital entity, also known as an avatar, digital character, or autonomous agent.

1. Hierarchical Look-Up & Polyphone Concatenation

Technical Problem

Procedural speech animation and online real-time generation of 3D animation curves are limited by small sets of animation sequences, as robotic, unrealistic, and repetitive animations are frequently observed, especially at the transitions of the visemes.

A further challenge in animating speech is that humans co-articulate, in other words, visemes may overlap and crowd each other out; complicating the speech's visual representation. Merely stitching together viseme sequences does not capture the natural variation that occurs in speech as mouth movements may vary according to their context (such as the preceding and/or subsequent visemes). I.e. the mouth shape corresponding to a phoneme depends not only on the spoken phoneme itself, but on the phonemes spoken before and/or after the instant phoneme. An animation method which does not account for coarticulation effects would be perceived as artificial to an observer because mouth shapes may be used in conjunction with a phoneme spoken in a context inconsistent with the use of those mouth shapes.

Furthermore, prior speech animation techniques fail to explicitly model speech styles; i.e. a continuum of viseme shapes manifested by intentional variations in speech, and/or person-dependent speaking styles (akin to a visual accent).

Technical Solution

To realistically animate a String of speech (such as a sentence) a hierarchical search algorithm is provided to search for stored examples (Animation Snippets) of sub-strings of the String, in decreasing order of sub-string length, and stitch retrieved sub-strings together such that they complete the String of speech animation.

The sub-strings may be unique part-phoneme strings of polyphones and part (or half) phonemes. Sub-strings may be concatenated at the mid-point of phonemes, which is generally the most stable part of a phoneme (varying the least regardless of adjacent phonemes), increasing the chance of a smooth transition between concatenated sub-strings.

DETAILED DESCRIPTION

Model Creation

Figure 2:
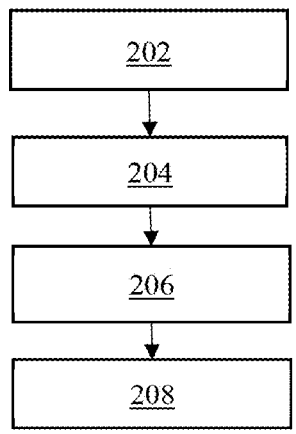
FIG. 2 shows a flow diagram of creating a lookup table.

A phonetically rich corpus generates a densely populated Lookup Table with multiple examples of Animation Snippets for each Item in the Lookup Table. FIG. 2 shows a flow diagram for creating a Lookup Table. At step 002, motion capture of a speech performance of a phoneme-rich corpus by an actor is performed. The actor carries out the speech performance (e.g. reads a corpus) in a neutral facial expression. Facial landmarks may be tracked during the speech performance. Fiducial landmarks that track movements of facial muscles as one speaks may be identified and marked on the actor's face, for example using a face paint of bright colors. The fiducial landmarks preferably have good coverage of the face, especially in the mouth region, and good contrast against facial features of the actor in the video recordings. The fiducial landmarks may be tracked manually or automatically in every frame of the video recordings.

Step 204 comprises automated phoneme labelling of the speech performance with timestamps, such as by natural language processing which generates contextual information of the speech, for example, prosody and part-of-speech tags. Step 206 comprises facial retargeting of a 3D blendshape rig onto the speech performance to generate a time series of blendshape weights. The movements of the facial fiducial landmarks are retargeted onto FACS action units (AUs). An image regularization and retargeting system as described in WO2017044499A1 (owned by the present applicant & incorporated by reference herein) may be used for retargeting the facial performance when creating data for the concatenation model. Step 008 comprises the creation of a Lookup Table that stores time series of the facial blendshape weights.

Lookup Table Creation

The Lookup Table of a speech animation model is hierarchically organized, constructed based on phonemes, syllables, words and sentences in the corpus. Such information may be acquired from text processing modules, comprising of tokeniser, text normalisation, part-of-speech tagger and phonemisation. In one embodiment, the Lookup Table includes nine Collections of Items, namely, left halfpho, right halfpho, dipho, sentence-boundary dipho, vowel-centered tripho, consonant-centered tripho, sentence-boundary tripho, syllable, and word Collections. In each Collection of the Lookup Table, there may be one or more Items that fit the description of the Collection. Items in the Lookup Table may be part (e.g. half) phoneme Strings.

Diphone concatenation systems feature in speech synthesis: A phoneme may be split into the left and right half phonemes (halfphos). A diphone (or dipho) is an acoustic unit which extends from the middle of one phoneme to the middle of the next phoneme (i.e. composed of a right halfpho (half phoneme) at the front and a left halfpho at the back, including the transition between each part (or half) phoneme. Synthesis using concatenation of diphones provides good voice quality since each diphone is concatenated with adjoining diphones where the beginning and the ending phonemes have reached steady state, and since each diphone records the actual transition from phoneme to phoneme. In a similar manner, in speech animation, to map viseme images to a diphone, a "diseme" comprising a series of images which dynamically depict lip, teeth and tongue positioning to captures the transition between two visemes. A diseme (like a diphone) begins somewhere during one viseme (phone) and ends somewhere during a following viseme (phone).

An example illustrating the decomposing of a sentence into Items categorized by Collections including polyphones, and half-phonemes, is given in FIG. 4. FIG. 4 shows text processing of a sentence "Author of the danger trail Phillip Steels et cetera", for adding Animation Snippets to a Lookup Table. When constructing a Lookup Table, each sentence in the corpus undergoes speech analysis to reveal the sequence of phonemes involved in producing the sound of that sentence. The sequence of phonemes is searched exhaustively to provide example Animation Snippets for each collection of Lookup Table Items. The Items in each collection of the Lookup Table may contain none, one, or multiple examples of Animation Snippets, sorted according to their duration.

In one embodiment, Collections comprise Items of different polyphone units. Polyphones comprise groups of two (diphones), three (triphones) or more phones and may be stored by segmenting the desired groupings of phones at stable regions (generally mid-phoneme). Thus, by treating polyphones as the basic subunits, the transition between two adjacent phones is preserved in the recorded subunits, and the concatenation is carried out between similar speech poses. Thus, the first and last phonemes of Animation Snippets in the Lookup Table are right and left halfphos, respectively as Animation Snippets from different time points are blended at or about the mid-points of phonemes. The transition from one phoneme to another is obtained from a continuous piece of Animation Snippets to ensure the smooth flow of the generated animation.

The word Collection contains Animation Snippets for words of more than one syllable. The example sentence "Author of the danger trail Philip Steels et cetera." had four words with more than one syllable. The Animation Snippets of these words are distinct Lookup Table Items in the word collection. Repeating words and words with the same pronunciation, absent in this example, would go into the same lookup Item as different examples. A Syllable is a unit of pronunciation that includes one or more phonemes, but only one of them is a vowel. The Syllable Collection contains Animation Snippets for syllables and words of a single syllable.

The example sentence of has five words of a single syllable. The Animation Snippets of these words are distinct/separate Lookup Table Items in the syllable collection. Words with multiple syllables are also broken into syllables to provide example Animation Snippets for syllable lookup Items. For example, word "author" is broken into syllables "O" and "D @". Each of these syllables went into a different lookup Item. Syllables with the same pronunciation would go into the same lookup Item as different examples.

A Tripho is unit of sound composed of a right halfpho at the front, a whole phoneme in the middle, and a right halfpho at the back. The Vowel-centered tripho collection contains Animation Snippets for all the triphos with the central phoneme being a vowel. The sequence of phonemes in the example sentence is searched exhaustively for vowel centered triphos. The first vowel-centered tripho "ID @ O/" in the example sentence with phonemes had the vowel phoneme "@" from the word "author". The phonemes before and after "@" are "D" from the word "author" and "O" from the word "of", respectively. The Consonant-centered tripho collection contains Animation Snippets for all the triphos with the central phoneme being a consonant. A sentence-boundary tripho collection contains Animation Snippets for the triphos at the beginning or the end of the sentences. In this collection, the silence before or after a silence is considered as a halfpho. There are two sentence-boundary tripho in each sentence and it comes from the first and the last phonemes in the sentence. In the example sentence, they are /O T/ from the word "author" and /r @/ from the word "cetera". Since the silence before or after a sentence is also considered as a halfpho in this collection, the /O T/ example included the right half of the silence before the sentence, the whole of the phoneme /O/, and the left halfpho of /T/. Similarly, the /r @/example included the right halfpho of /r/, the whole of the phoneme /@/, and the left half of the silence after the sentence.

The dipho Collection contains Animation Snippets for all the diphos. A sentence-boundary dipho collection contains Animation Snippets at the beginning or the end of a sentence. In this collection, the silence before and after a silence is considered as a halfpho. Hence, this collection contains Animation Snippets for the first halfphos at the beginning of the sentences and those for the last right halfphos at the end of the sentences. There are two sentence-boundary diphos in each sentence and they come from the first and the last phonemes in the sentence. In the example sentence, the first sentence-boundary dipho is the left half of the silence before the sentence, the right halfpho /O/ from the word "author". The second sentence-boundary dipho is the right halfpho /@/ from the word "cetera" and the left half of the silence after the sentence.

The Left halfpho Collection contains Animation Snippets for all the left halfphos and the right halfpho Collection contains Animation Snippets for all the right halfphos.

The categorization of Collections described above is only one possible categorization; in other embodiments, Collections may include less granular Collections such as a sentence Collection, or multi-word Collections.

Figure 3:
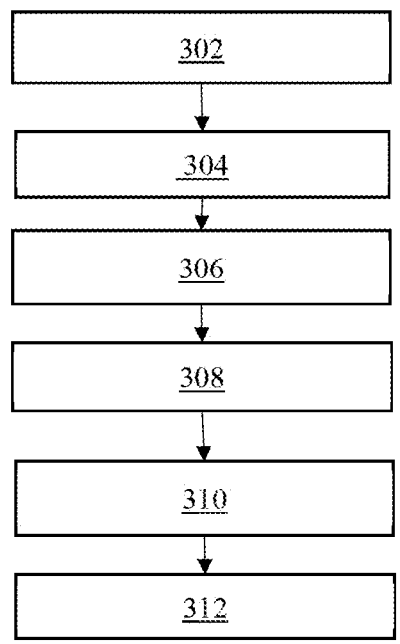
FIG. 3 shows a flow diagram of a method of animating speech.
Figure 9:
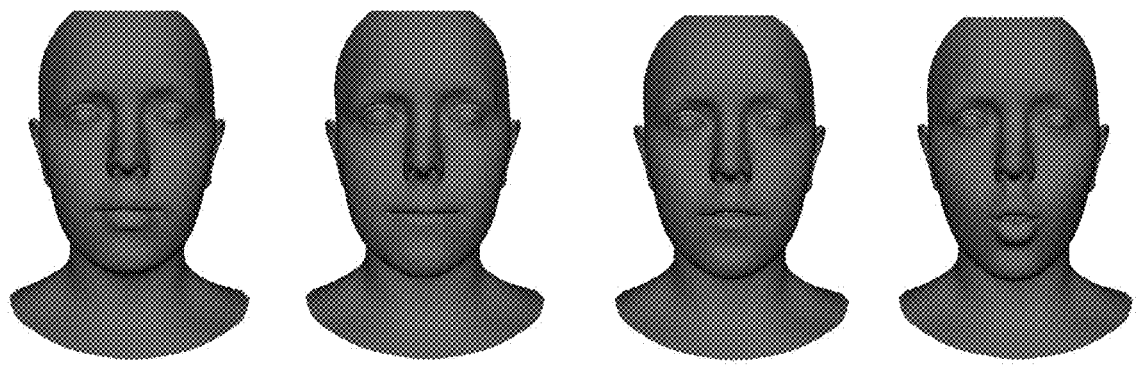
FIG. 9 shows viseme pose examples.
Figure 10:
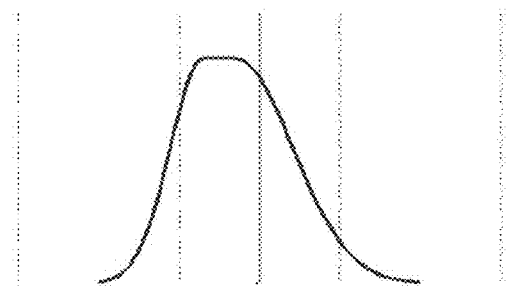
FIG. 10 shows an example of a modified Gaussian.
Figure 11:
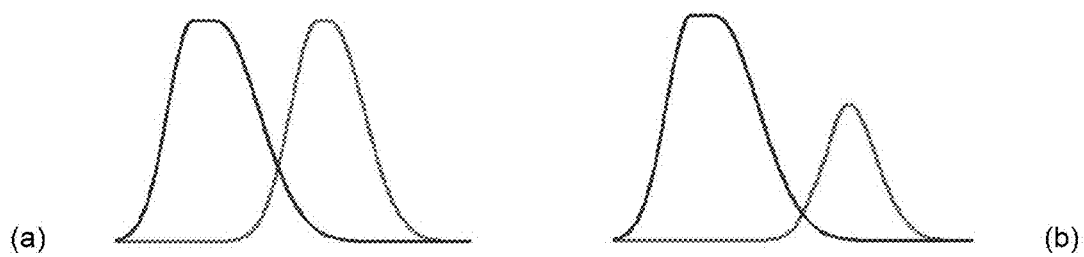
FIG. 11 shows an example of two overlapping Gaussian curves.

Real-Time Generation of Animation:

FIG. 3 shows a flow diagram of a method of animating speech. At step 302, phoneme timestamps and contextual information of input sentences are generated. Contextual information includes pitch, stress, syllable and word information etc. At step 304, time series of the facial blendshape weights are concatenated, selected based on the information provided in step 302, to form a piece of continuous 'data-driven' speech animation as explained under "Generation of speech animation". At step 306, phonemes related to distinctive mouth shapes (e.g. p, b, m, f, w.) are blended with manually posed viseme examples for better visual cues (as described in further detail in part 2 "Blending with Model Visemes"). At step 308, the animation is smoothed and blended. At step 310, the speech animation is modulated based on energy. At step 312, the animation is played back, synchronized to the audio.

Generation of Speech Animation

A sequence of phonemes is generated by the speech analysis software after receiving the text to be converted to speech. The selection of the Animation Snippets from the Lookup Table is performed using a hierarchical algorithm. Larger continuous pieces of Animation Snippet are used whenever possible. The search of a Collection in the Lookup Table is exhaustive, and only goes to the next Collection down in the hierarchy when no additional matches can be found.

FIG. 5 and FIG. 7 show examples of Animation Snippet concatenation, from a Lookup Table constructed using a corpus of 1231 sentences.

FIG. 7 shows the sentence "And we will go meet her Wednesday at the train station." At 702, the Word Collection of the Lookup Table is searched for matching words. Words of more than one syllable are identified in the example sentences. The words "wednesday" and "station" are present in the corpus and their corresponding Animation Snippets are selected. Blending is performed at the first and last half-phonemes of these Animation Snippets. At 704, the Syllable Collection of the Lookup Table is searched for the syllables other than the syllables already covered by the words which were found at step 702. Words of a single syllable and individual syllables from multi-syllable words undergo the hierarchical search process. The matching syllables are listed in the "Syllable" row of the diagram. At 706 the vowel-centered tripho collection is searched. Matching Animation Snippets were found for most of the phonemes using the word and syllable collections, however, a match could not be located for the word "train" (/t r EI n/) in the syllable collection. Hence, the search hierarchy continued to the vowel-centered tripho collection and found an example for /r EI n/. Out of the remaining halfphos that do not have Animation Snippets selected in the example sentences, a matching consonant-centered tripho 708 sequence /A s d/ is found. No matching examples in the sentence-boundary tripho collection are retrieved because the animation for the right halfpho of the first and the left halfpho for the last phoneme of the sentences are already allocated.

The gap between each pair of two consecutive syllables, including the right half of the last phoneme of the syllable in the front and the left half of the first phoneme of the syllable at the back, is populated by matching Animation Snippets in the dipho 710 collection. The first and the last halfphos of the two example sentences are populated by the matching Animation Snippets in the sentence-boundary dipho collection. When there is not any gap left in the two example sentence, the hierarchical search is complete. Search in the left and right halfpho collections is not required because all the gaps are fully populated with Animation Snippets from Collections higher in the category.

Selection of Animation Snippets

The recording index, start time, and end time in the recording of the speech performance is recorded for each Animation Snippet in the Lookup Table. When two or more Animation Snippets are present for a given Item being queried, an Animation Snippet may be retrieved in any suitable manner. In one embodiment, an Animation Snippet is retrieved at random. In another embodiment, the Animation Snippet which has the closest duration (end time minus start time) to a corresponding speech snippet. The Animation Snippet may be selected based on speech features, or contextual information of the input sentences to be generated. Contextual information may include pitch, stress, syllable and word information etc. In one embodiment selection of the Animation Snippet may be pseudorandomized such that matches the duration of a corresponding speech snippet within a range, but does not deterministically return the same (i.e. the closest) Animation Snippet given a certain corresponding speech snippet length.

Source (associated Animation Snippet recordings) speech and target (synthesised) speech will in most cases, have different audio durations. The source animation are therefore stretched (or compressed) to fit inside the target audio duration. This stretching (or compression) may be done using a piecewise polynomial interpolation where the phoneme boundaries on the source animation are transformed to match the target audio.

In one embodiment, Animation Snippets are associated with the original speech and/or other sound/audio which they depict. This may be achieved, for example, by capturing audio along with video as an actor carries out a speech performance, as described at step step 202. High quality microphone booms may be positioned about the actor in a manner that does block the camera or cameras from recording actor mouth movements. Alternatively, and/or additionally, an entire image/video capture apparatus may be in a sound-proof room configured for audio recording. Thus, Animation Snippets may be stored as a combination of visual and audio information that is concatenated, or Animation Snippets may be associated with their corresponding source audio information.

A Viterbi-based dynamic programming can also be applied to jointly minimize the target cost and join cost. The target cost in this case can be defined as the difference in phoneme duration, energy and pitch etc. between source (collection) and target (synthesised) speech. The join cost is the sum of muscle channel differences when concatenating two phonemes.

2. Blending with Model Visemes

Technical Problem

Some procedural models of speech animation may include realistic co-articulation schemes, for example, a dominance model that uses dominance functions that overlap; giving values indicating how close a given viseme reaches its target shape given its neighbourhood of phonemes. However, the dominance model fails to adequality ensure lip closure of bilabials (/m b p/) and proper depiction of certain other phonemes.

Technical Solution

In one embodiment, real-time generation of speech animation uses model visemes to predict the animation sequences at onsets of visemes and a look-up table based (data-driven) algorithm to predict the dynamics at transitions of visemes. Specifically posed Model Visemes may be blended with speech animation generated using another method (such as that described under part 1 "Hierarchical Look-Up & Polyphone Concatenation") at corresponding time points in the animation when the visemes are to be expressed.

DETAILED DESCRIPTION

Model Visemes

Visual examples of one or more phonemes, aka visemes may be manually posed or deliberately selected as model visual examples realistically showing the visemes at their onset (henceforth "Model Visemes"). Model Visemes may be Lip-Readable Visemes created for phonemes relating to distinctive mouth shapes, and may assist in portraying the full development of visual cues for the purpose of lip-reading. Static poses of visemes may be manually created by an experienced artist by altering the expression weights for a single frame. shows viseme pose examples (left to right): neutral, phoneme /m/, phoneme /V, phoneme /w/.

A static pose of viseme may be manually created by an experienced artist by altering the expression (FACS) weights or by scanning the actual subject and adding as an incremental combination blendshape in a blendshape model. In one embodiment, visemes are created for phonemes that require the lips or teeth pressed together, for example, /b/, /p/, /m/, /V, and /v/; and phonemes that required the lips to funnel, for example, /o/ and /w/. The level of activation of these snapshots over the duration of their corresponding phonemes is described by a modified Gaussian function with a flat-top and a peak of 1 (full activation).

The flat-top Gaussian function ensures that visual depiction of a phoneme is held at its full activation for a certain duration (e.g. at least one frame) so that it is visible to the user. This modified Gaussian function may be left skewed. This is to reflect the fact that the full activation of a viseme may happen at any point during the sound. For example, the lips are fully pressed together before the sound of phoneme "b" or "p" is produced. The skewness and spread of the Gaussian are automatically adjusted based on the duration of the current phoneme as well as the one before (to the left) and after (to the right) of the current phoneme.

Activation Curve

The level of activation of these snapshots over the duration of their corresponding phonemes is described by the modified Gaussian function with a flat-top (note this is different from a flat-top Gaussian function) and a peak of 1 (full activation). The weights of the modified Gaussian function also serves as the blending weights between the concatenated Animation Snippets and the manually posed snapshots of the visemes. When the weight of the modified Gaussian function at a frame is 1, the expression weights for this frame comes solely from the manually created snapshot of the corresponding viseme. When the weight of the modified Gaussian function is 0, the expression weights comes solely from the concatenated Animation Snippets.

When multiple Gaussian functions overlap, a normalisation step is performed to adjust the intensity of the lower priority shapes. This normalisation is performed based on the priority weights that the user assigned to each phoneme. For example, when a viseme Gaussian curve from /b/ overlaps with the viseme Gaussian curve for /o/, their strengths can be adjusted so that /b/ dominates the animation to maintain the closure of lips during uttering of /b/ phoneme. shows an example of two overlapping Gaussian curves (a) before normalisation and (b) after normalisation. These parameters can be assigned through experience or based on physiological and anatomical observations, such as the place of articulations.

In one embodiment, animation is based on blendshapes of Muscle-Based Descriptors, such as FACS AUs, and Model Visemes are blended with an animation sequence generated using the "Hierarchical Look-Up & Polyphone Concatenation" technique described above. The resulting phoneme Gaussian curve is mapped onto FACS using mappings defined by the artist, and blended into the concatenated Animation Snippets. The weights of the modified Gaussian function serve as the blending weights between the concatenated animation snippets and the manually posed snapshots of the visemes. When the weight of the modified Gaussian function at a frame is 1, the expression weights for this frame comes solely from the manually created snapshot of the corresponding viseme. When the weight of the modified Gaussian function is 0, the expression weights comes solely from the concatenated animation snippets.

In a more general approach, a parameterised spline model that describes the lip shape at each stage of the formation of a phoneme can be used in place of the modified Gaussian function.

Smoothing of Concatenated Animation

In one embodiment, the generated FACS animation undergoes a two-stage smoothing and augmentation process. The first stage of smoothing operates on expression weights over the domain of syllables. If additional smoothing is required, a second stage of smoothing operates on the expression weights over the domain of sentences.

The first stage of smoothing uses a hierarchical filtering strategy, where a low-pass Butterworth filter is applied to each syllable, then to each word, then to each phrase. At each level, the cutoff frequency of the Butterworth filter is increased from the previous level. This ensures that higher smoothing is applied to within a syllable compared to syllable boundaries, and similarly higher smoothing is applied to within a word compared to word boundaries. In addition, the cutoff frequency of syllables and words are adjusted based on the average duration of the compositing phonemes. This ensures that smoothness is maintained independent to the rate of speech.

The second stage of smoothing consists of a collection of standard animation cleaning up operations, such as bounding the animation weights, fitting a spline curves to remove outliers, and apply sigmoid windowing operation to ensure the mouth shape returned to a desired resting position after the speech ends. In addition, the animation weights are further augmented based on the energy of the speech. For example, louder speech will translate to larger movement for some animation channels such as jaw open.

3. Generation of Head and Eyebrow Animation Through Concatenation

Head movements and eyebrow animations are generated in a similar manner as described under "Hierarchical Look-Up & Polyphone Concatenation". For head movement animation, tilt, pitch and yaw as well as the shoulder translations are concatenated. For eyebrows animation, AUs related to eyebrows motion (such as inner and outer brow raiser, brow lowerer etc.) are concatenated. However, different to lip sync animation, the head and eyebrows animations operate on the phrase unit.

The real-time generation of head and eyebrow animation involves the following steps:
  1. Generation of sentence and word timestamps and contextual information of input sentences.
  2. Concatenation of time series of the head rotation and translation, selected based on the information provided in step 1.
  3. Concatenation of time series of the eyebrow animation, selected based on the information provided in step 1.
  4. Smoothing and blending of the animation.
  5. Adding emotions into the animation signals.
  6. Playing back the animation synchronised to the audio.

Phrase Collection

The number of syllables in each of the phrases are collected to find matching animation snippets. If multiple animation snippets are found, they are ranked based on the similarity of the stress syllable positions within the phrase. If multiple phrases with matching stress syllable positions are found, they are again ranked by the duration of the phrases. If no matching animation snippets are found on the input phrase, the phrase is separated into sub-phrases at the word boundary of a conjunction word. If no conjunction word is found, the system switches to match only the number of stresses in the phrase. If still no match is found, the system will start breaking the phrase at the word boundary closest to the midpoint of the phrase (i.e. binary fission).

Keywords Collection

Certain keywords such as good, bad, yes and no etc. are often associated with particular head and eyebrow movements (i.e. head nodding, head shaking and raised eyebrows etc.). If those keys words are found within the phrase, animations on those words are replaced by the animation snippets found in this collection. Once the animation is generated, the animation sequence is then filtered to smooth out the noise and remove concatenation artifacts.

Generation of Tongue Animation from Example Poses

Since it is difficult to motion capture tongue movements during normal speech, the tongue animation is generated from manually created example poses for each phoneme. The example poses may be blended with animation as described under "Blending with Model Visemes". Similarly, the normalisation weights may be derived based on the place of articulations for those phonemes.

4. Emotional Speech

Technical Problem

Prior approaches have pre-recorded several examples of speech animation taken in different emotional states and produced emotional speech by selecting the speech animation with the desired emotion. However, it is time-consuming to create such an animation model because the amount of speech that is recorded would be multiplied by the number of emotional states which may be represented during speech. This is unscalable and does not allow nuanced emotional states to be readily interspersed and integrated with speech. Other approaches have segmented a face into a speaking region and an emotion-expressing regions and controlled the regions separately to animate both emotion and speech. The result does not look natural or realistic, as the full face may express emotion; and the muscles involved are not mutually exclusive.

Technical Solution

An Output Weighting Function is used to map Speech input and Expression input into Muscle-Based Descriptor weightings.

DETAILED DESCRIPTION

A Speech animation can be composited with Expression animations to form expressive speech animations. shows an animation system. Under a simplified embodiment, an Animation Composer 005 receives two animation inputs, including Speech animation and Expression animation. The Animation Composer 005 uses a Output Weighting Function to reconcile received animation inputs. For example, whenever Speech animation is received simultaneously with Expression animation, animation channels (Action Units) which are defined as being "speech dominated" are suppressed (or constrained, in other words, inhibited on a weighted basis/downweighted), such that the output animation of those animation channels are only or are principally affected by their respective inputs from the Speech animation engine.

Expression animations can be generated in any suitable manner. In one embodiment, animations are generated using a neurobehavioural model/virtual central nervous system modelling the internal emotional state of the subject being animated. The use of a neurobehavioral model to animate a virtual object or digital entity is further disclosed in WO2015016723A1, also assigned to the assignee of the present invention, and is incorporated by reference herein. In another embodiment, animation may be provided through the empathic mirroring of the subject during an interaction. Alternatively and/or additionally, a pre-recorded animation of emotional or communicative expression may be provided. A combination of any suitable animation inputs as described above or otherwise may be provided. Expression animations may be presented as a collection of time-varying FACS AU weights which are added to speech (lip synchronization) animation.

Muscle-Based Descriptor Class Weighting

In order to prevent Expression animations from interfering with Speech lip sync animations or vice versa, two muscle-based descriptor classes are defined, namely Expression AUs and Speech AUs. Each AUs are then assigned two class weightings (summing up to 1.0), determining the relative importance of each AU in expressing different types of animation sequence (such as Speech sequences or Expression sequences). In some embodiments, Muscle-Based Descriptor Class Weightings may be coefficients to Speech and Expression animation inputs in the Output Weighting Function.

In some embodiments, constraints can be applied, such that final muscles weights for animation are constrained to less than or equal to one i.e. Sum(AU)<=1. For example full activation of a smile (activating the Zygomatic Major muscle AU12) combined with activation of the speech driven Zygomatic Major AU12 may be activated by driving the final animation using the activations of both the emotion and speech weightings, but constraining the final activation of the Zygomatic Major muscle to 1. For example, a half smile (AU12=0.5), and speaking the word "sheep" (AU12=0.75) would result in Sum(AU12)=0.5+0.75=1.25, which is constrained to 1.

Priority Weighting

During animation composition, each Animation Input may have a priority value for each class (also summing up to 1.0). This priority value can be thought of as the type of animation sequence that is desired to be prioritized or portrayed more clearly. For example, when an animation is intended to show speech in a clear and understandable manner, the Priority Weighting for Speech may be increased. Conversely, when an animation is intended to show a digital character being emotional to an extent that it impedes the digital character's speech, the Priority Weighting for Expression or emotion may be greater than that of speech, or at least increased.

Animation Composer

The Animation Composer receives Priority Weightings and the Animation Composer determines the multiplier which it uses to augment the input sequences. In one embodiment, functions are defined as follows:

$$w = \alpha_s \cdot w_s + \alpha_e \cdot w_e$$

$$\alpha_s = p_s + p_e \cdot (c_s - c_e)$$

$$\alpha_e = p_e + p_s \cdot (c_e - c_s)$$

Wherein:

| | |
|---|---|
| $w_s$ = input speech weight | $c_e$ = Muscle-Based Descriptor Class Weighting on expression |
| $w_e$ = input expression weight | |
| $p_s$ = Priority Weighting on speech | $\alpha_s$ = an output multiplier on speech |
| $p_e$ = Priority Weighting on | $\alpha_e$ = an output multiplier on |

| | |
|---|---|
| expression | expression and $\alpha_s$ and $\alpha_e$ are |
| $c_s$ = Muscle-Based Descriptor | bounded between 0 and 1. |
| Class Weighting on speech | |
| (categorization weight) | |

Figures 12, 13:
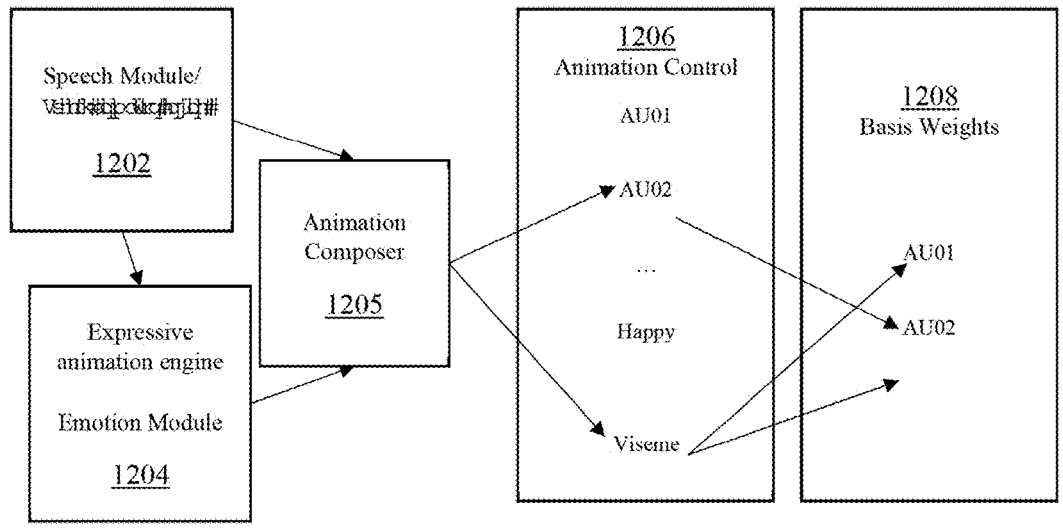
FIG. 12 shows an animation system.
FIG. 13 shows a table of animation priority values according to one embodiment.

FIG. 13 shows the animation priorities of AU12, AU22 and AU26 (the lip corner puller, funneler and jaw open AUs respectively). In this example, AU12 has a high Expression class weighting and no speech class weighting, whereas AU22 has high speech class weighting and no Expression class weighting. On the other hand, AU26 is a mixture of the two. When priority is given to Expression animations, AU12 from the Expression animation engine is let through (with a unit multiplier), whereas AU12 from the speech animation engine is completely suppressed, preventing it from interfering with the expression dominated animations (e.g. this will prevent the subject pulling the corner of the lips when the subject is also expressing sadness). However, AU22 from the speech animation engine will be allowed through so that the subject will attempt to form spoken words (e.g. attempt to speak while crying). As AU22 does not conflict with emotion it is unimpeded. When the class weightings are equal (i.e. AU26), the speech channel will also be inhibited to prevent it from double activation and breaking the Expression animation.

When priority is given to speech animations, AU12 from both the Expression and speech animation engines are let through. This is because AU12 is an Expression dominated AU, and does not interfere with the speech animation. AU22 from the speech animation engine will be allowed through to form spoken words, but the Expression animation engine will be inhibited to prevent interference. Similarly, AU26 from the Expression animation engine will also be inhibited, but AU26 from the speech animation engine will be let through.

For other class weighting combinations (e.g. AU24, lip pressor has a class weightings of 0.2 and 0.8 on the Expression animation and speech animation respectively), the animation composer will apply non-unit multipliers between zero and one to the input animation sequences to mitigate the interference.

Figure 15:
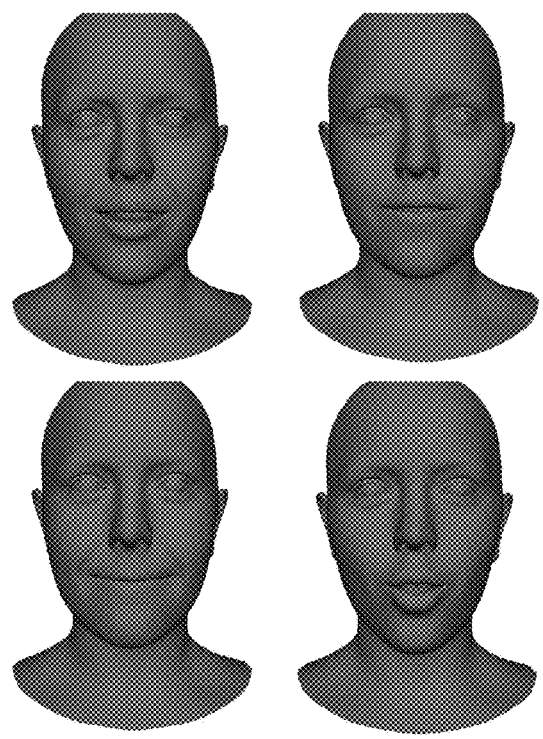
FIG. 15 shows viseme pose examples blended with a happy expression with priority on speech.
Figure 16:
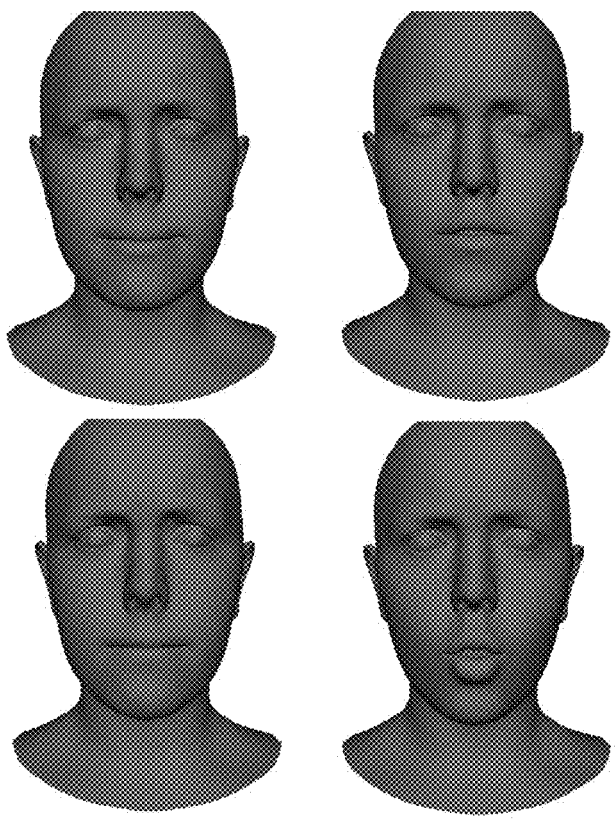
FIG. 16 shows viseme pose examples blended with a concerned expression with priority on speech.

FIG. 14 shows an example of augmentation of the animation composer for AU24. FIG. 15 shows viseme pose examples blended with a happy expression with priority on speech (top-left) happy expression, (top-right) phoneme /m/, (bottom-left) phoneme /f/, (bottom-right) phoneme /w/. AU26 (Jaw Open) is suppressed but AU06 (Cheek Raiser) and AU12 (Lip Corner Puller) remain present when forming the viseme shapes. FIG. 16 shows viseme pose examples blended with concerned expression with priority on speech (top-left) concerned expression, (top-right) phoneme /m/, (bottom-left) phoneme /f/, (bottom-right) phoneme /w/. AU24 (Lip Pressor) is suppressed and but AU04 (Brow Lowerer) remains present when forming the viseme shapes.

Customizing "Accents" for Speech Animation

The customizability of the viseme example poses and Gaussian function modifiers allow the user to adjust avatars' speaking styles and personalities. This in combination with a Digital character blending system (as described in prov. App. NZ747626), which can deform the anatomical structure, facial expressions as well as skin textures, will allow new characters to be created with unique speaking personalities.

In addition, the system can incorporate multiple Lookup tables that are captures from different people speaking different language, accent, or articulation style. During the animation generation stage, the user can select which table to reconstruct the animation from in order to match the visual appearance of the blended avatar.

Combined with Interpolation

The resulting speech animation are fed into the Blendshape Interpolation and Animation Framework [NZ Prov. App. 747627] to produce believable blendshape animations with nonlinear interpolation of combination and incremental shapes. In addition, Viseme example poses can be created from 3D scans of the actor/actress or sculpted by a digital artists. These examples poses can then be added as incremental combination shapes, allowing additional customization to the resulting lip shapes on these phonemes.

Moreover, instead of operating on FACS blendshapes, the viseme-based blendshapes can be used. Using the naming schemes defined NZ747627, the Animation Framework can used to decompose viseme-based blendshapes into FACS AUs during the animation stage. The advantage of this approach is that it will provide a more intuitive controls for the user. In addition, this will also constrain the facial retargeting system to only solve on viseme-based blendshapes, therefore producing cleaner solve results on the speech sequences.

Example Embodiment

In on embodiment, AU channels are categorized into the following groups:
Speech Mouth AUs e.g.: AU08liptowardeachother, AU18lippuckerer, AU22lipfunneler etc.
Emotion Mouth AUs e.g. AU12lipcornerpuller, AU15lipcornerdepressor, AU21necktightener
Other Mouth AUs e.g. AU16lowerlipdepressor, AU25lipspart, AU35cheeksuck etc.
Non-mouth AUs e.g. AU01innerbrowraiser, AU05upperlidraiser, AU09nosewrinkler etc.

In one embodiment, when the digital character/virtual entity being animated starts to speak, a temporally smoothed inhibition signal is activated. The inhibition signal is initially zero and gradually increases to the maximum of one as the avatar speaks on (the rate of increase is an adjustable parameter, which may be set to around 100 ms). The inhibition signal reduces the contribution of certain AU groups coming from the emotion stream (Expression animation input). The percentage of inhibition may be manually set and/or dynamically altered by other networks. In one embodiment, the AU categories defined above are reduced as follows:
Speech Mouth AUs—reduced by 100%
Emotion Mouth AUs—reduced by 50%
Other Mouth AUs—reduced by 100%
Non-mouth AUs—reduced by 10%

In addition to AU groups, specific reduction factors on individual AUs can be set. As the avatar finishes speaking, the inhibition signal gradually decreases and returns to zero. The rate of decrease is usually set at a slower pace (around 500 ms) to allow full expressivity to return to the face after the avatar finishes speaking.

REFERENCE SIGNS LIST

| | |
|---|---|
| 1 | Animation Snippet |
| 2 | Lookup Table |

| | |
|---|---|
| 3 | Collection |
| 4 | Item |
| 5 | Instance |
| 6 | Model Viseme |
| 7 | String |
| 8 | Muscle-Based Descriptor Class Weighting |
| 9 | Priority Weighting |
| 10 | Output Weighting Function |
| 11 | Speech |
| 12 | Expression |
| 13 | Muscle-Based Descriptor |
| 14 | Animation Composer |

INTERPRETATION

Whilst the methods and techniques described above have been described with reference to the English language, the invention is not limited in this respect. Embodiments may be modified to facilitate speech animation of any language. Bone-based animation rigging or any other suitable animation technique may be used in the place of blendshape animation.

In some of the embodiments described above, muscle deformation descriptors are action units (AU) 420 identified by the Facial Action Coding System (FACS). Examples of the action units include 'Inner Brow Raiser', 'Outer Brow Raiser', 'Lip Corner Puller', 'Jaw Open' and 'Lip Corner Puller and Jaw Open'. However, any suitable taxonomy for muscle deformation descriptors may be used. For example, muscle deformation descriptors may also be computed statistically. For example, the principal components of the mesh shape variation of the frames in the animations can be computed using a principal component analysis (PCA). When only the muscles of interest are involved in the animation, the computed principal components may be used as muscle deformation descriptors.

The methods and systems described may be utilised on any suitable electronic computing system. According to the embodiments described below, an electronic computing system utilises the methodology of the invention using various modules and engines.

The electronic computing system may include at least one processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the electronic computing system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium. The electronic computing system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general-purpose computing system specifically programmed to perform the described steps. Alternatively, the methods described herein may be implemented using a specific electronic computer system such as a data sorting and visualisation computer, a database query computer, a graphical analysis computer, a data analysis computer, a manufacturing data analysis computer, a business intelligence computer, an artificial intelligence computer system etc., where the computer has been specifically adapted to perform the described steps on specific data captured from an environment associated with a particular field.

The invention claimed is:

1. A method for animating a communicative utterance comprising:
receiving a String to be animated, the String comprising a plurality of communicative utterance atoms;
receiving a plurality of Collections, each Collection including a plurality of Items comprising unique atom strings, each Collection storing Items of different lengths, wherein at least one of the Items is based on an occurrence of acoustic silence before or after a particular communicative utterance atom, and each Item including at least one Animation Snippet of the Item;

hierarchically searching the Collections for Items matching substrings of the String, wherein the hierarchical searching favours longer Items;

retrieving Animation Snippets for matched Items to cover the communicative utterance atoms; and combining the retrieved Animation Snippets to animate the String.

2. The method of claim 1 wherein the communicative utterance is speech; and wherein the at least one of the Items is pre-defined as the occurrence of acoustic silence before or after the particular communicative utterance atom.

3. The method of claim 1 wherein at least one Item includes a plurality of Animation Snippets, and an Animation Snippet is retrieved based on its duration.

4. The method of claim 1 wherein at least one Item includes a plurality of Animation Snippets, and an Animation Snippet is retrieved based on corresponding speech features.

5. The method of claim 1 wherein the Animation Snippets are associated with sound corresponding to the animation.

6. The method of claim 5 further comprising:

compressing and/or stretching the Animation Snippets to match the sound corresponding to the animation.

7. The method of claim 1 wherein one or more of the Items are included in a first Collection of Items from a plurality of different Collections of Items;

wherein the first Collection of Items comprises a Sentence Boundary Collection that includes a first type of dipho string and a second type of dipho string;

wherein the first type of dipho string represents an occurrence of acoustic silence pre-defined as being paired with a subsequent respective syllable type; and wherein the second type of dipho string represents an occurrence of acoustic silence pre-defined as being paired with a preceding respective syllable type.

8. The method of claim 1 wherein the Animation Snippets store Muscle-Based Descriptor weights.

9. A method for animating a phoneme in context comprising:

receiving a Model Viseme;

receiving an Animation Snippet corresponding to a time series of animation weights of the phoneme being pronounced in context, the Animation Snippet of the phoneme based at least on a string that includes an occurrence of acoustic silence pre-defined as being before or after at least a particular portion of the phoneme; and blending between the animation weights of the Model Viseme and animation weights of the Animation Snippet to animate the phoneme in context, wherein a degree of blending of the Model Viseme over time is modelled by a function, with a peak of the function being at or about a peak of the phoneme being pronounced.

10. The method of claim 9 wherein the Model Viseme is a Lip-Readable Viseme depicting the phoneme in a lip-readable manner.

11. The method of claim 9 wherein the Model Viseme is represented as an animation sequence.

12. A method for expressive speech animation including:

receiving a Priority Weighting for one or more animation inputs, wherein an Output Weighting Function is a function of the Priority Weighting, the one more animation inputs based on concatenated Animation Snippets, wherein a first Animation Snippet represents a phoneme based at least on a string that includes an occurrence of acoustic silence pre-defined as being before or after at least a particular portion of the phoneme;

receiving a first animation input associated with muscle-based descriptor information and a second animation input associated with muscle-based descriptor information;

defining at least one Muscle-Based Descriptor Class Weighting for each muscle-based descriptor;

using the first animation input and the second animation input as arguments in the Output Weighting Function configured to map the animation inputs to muscle-based descriptor weightings for animating the expressive speech animation, wherein the Output Weighting Function is a function of the Muscle-Based Descriptor Class Weightings, wherein the Output Weighting Function is configured to reconcile muscle-based descriptor information from the first and second animation inputs; and animating using the mapped muscle-based descriptor weightings.

13. The method of claim 12 wherein the first animation input is for animating Speech.

14. The method of claim 12 wherein the second animation input is for animating Expression.

\* \* \* \* \*